Patented Aug. 9, 1949

2,478,495

UNITED STATES PATENT OFFICE 2,478,495

POLYMERS CONTAINING POLYMERIC CHAIN CARBON ATOMS TO WHICH ARE ATTACHED CARBOCYCLIC RING CONTAINING RADICALS

Carl Shipp Marvel, Urbana, Ill., assignor to E. I. du Pont de Nemours & Company, Wilmington, Del., a corporation of Delaware No Drawing. Application March 6, 1945, Serial No. 581,341

5 Claims. (Cl. 260—85.7)

1

This invention relates to novel synthetic polymers and their preparation and it is particularly concerned with novel vinyl type polymers and derivatives thereof.

In connection with the study of synthetic polymers during the past few years, some attention has been given to the derivation of polymers, copolymers and interpolymers from monomeric vinyl compounds. However, the vinyl type polymers heretofore known are generally thermoplastic and possess softening points so low that the polymers have little or no value in certain industrial fields where moderately high softening points are required, e. g. the field of textile yarn. Many vinyl type polymers are soluble in a wide variety of common solvents and while this characteristic is desirable for some purposes, it is a deterrent to the manufacture of many types of shaped articles in which resistance to the solvent action of common solvents is needed.

One object of the present invention pertains to the preparation of novel synthetic polymers. A further object pertains to new polymers capable of being readily converted to polymeric derivatives having different chemical and physical properties. A still further object pertains to new vinyl type polymers. Other objects will appear hereinafter.

The objects of the invention are accomplished in general by subjecting to polymerization a compound containing a vinyl (including alpha-substituted vinyl) group and having attached to the alpha atom of the vinyl group an additional group or radical which is inactive during the polymerization and which is attached to but separated from said alpha group atom by a carbocyclic ring, said inactive groups in the resulting polymer being readily converted by hydrolysis, alcoholysis or saponification to aldehyde groups. In view of the inert character of said inactive groups with respect to the polymerization of the monomer and their ready conversion to aldehyde groups, these groups will be referred to hereinafter as "masked" aldehyde groups. The polymer resulting from the hydrolysis, alcoholysis or saponification can, by virtue of the presence of the aldehyde groups in its molecule, be readily reacted to produce cross-linking as will be explained in more detail hereinafter, with a concomitant change in chemical and physical properties. Because of the masking of the aldehyde groups which are potentially contained in the monomeric material and the polymers produced therefrom, the polymers are linear in character and may be of very high molecular weight. It is preferred that the polymer finally

2 produced after hydrolysis, alcoholysis or saponification contain not only aldehyde groups, but also hydroxy groups since these groups can cross-link with each other between identical molecules and thereby produce the desired change in solubility, fusibility and other characteristics.

In order to facilitate an understanding of the invention, the following simple chemical reactions are given to illustrate the preparation of the preferred type of polymer which contains both aldehyde and hydroxy groups in the reaction involving conversion of this polymer by cross-linking. Thus, paravinyl benzylidene diacetate and vinyl acetate are mixed in a mol ratio of 1:2 and are then subjected to polymerizing conditions yielding a product having the following polymeric chain structure:

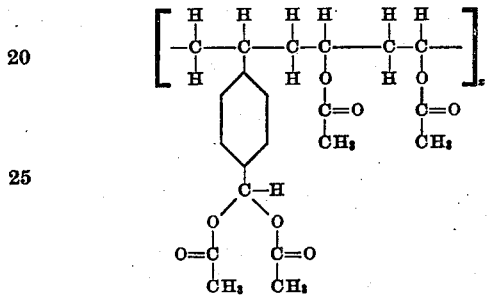

This structural formula is designated as Formula (1) and assumes a head-to-tail linking of the vinyl benzylidene diacetate and vinyl acetate as occurs in the polymerization of vinyl acetate by itself, the vinyl benzylidene diacetate likewise presumably polymerizing by itself in the same head-to-tail fashion. The carbon atoms in the horizontal chain of Formula (1) are called chain carbon atoms for convenience. Upon hydrolysis, saponification or alcoholysis in an alkaline medium, the ester groups are removed to yield a product having the polymer chain structure:

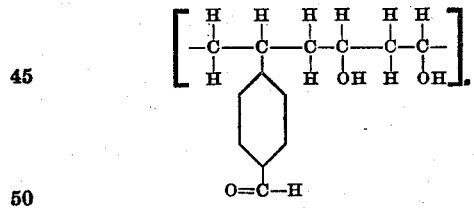

This structural formula is designated as Formula (2) and the polymeric compound of this formula is stable so long as it is not subjected to elevated temperature and/or acid conditions. In an acid medium, this intermediate product automatically cross-links, with the liberation of water to form an insoluble, substantially infusible product such as is represented by the following structural formula:

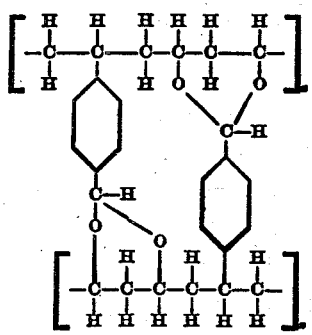

this structural formula being designated as Formula (3).

The subscript "$x$" occurring in the above Formulas (1), (2) and (3) represents the number of chain units in the polymer molecule.

An essential part of the polymer of Formula (1) is the presence of a dangling carbon atom having two valences satisfied with hydrolyzable groups which take no part in the polymerization reaction, the dangling carbon atom being attached to the alpha-vinyl carbon atom in the polymeric chain through a ring carbon structure. As stated above, the aldehyde must be covered or "masked" to prevent it from reacting and interfering with the synthesis of the linear polymer. The attachment of two ester groups is simple and generally preferable, but the aldehyde may otherwise be immobilized or masked; e. g. the aldehyde may be covered by other groups such as ether, thioether or halogen groups, or the aldehyde groups may be covered by a mixture of groups, e. g. in part by ester groups and in part by other masking groups and used with very satisfactory results.

In the illustration given above, both cross-linking groups (—CHO and —OH) are present, or potentially available in the same polymer and generally, this is desirable but not at all necessary in order to have synthetic addition polymers of improved utility. Many polymers, natural and synthetic, have hydroxyl groups that will cross-link with the aldehyde groups contained in the polymer that may be formed through the practice of this invention. For instance, cellulose, partially stubstituted cellulose derivatives, polyvinyl alcohol or interpolymers thereof are excellent materials with which to effect cross-linkage. Furthermore, there are numerous di- and polyhydric alcohols such as glycerol and the glycols which may be used effectively to cross-link polymers formed through the practice of this invention when the polymer itself contains no hydroxyl groups. In some cases, it may even be desirable to effect cross-linking reactions such as were just previously discussed, even though the polymer itself contains hydroxyl groups.

To produce polymers of certain solubility characteristics, the masked aldehyde compound may be interpolymerized with a major proportion of certain other ethylenic compounds having the desired solubility characteristics so that the aldehyde-containing polymer eventually formed may be used more advantageously. In the case of interpolymers of vinyl benzylidene diacetate and vinyl acetate for example, a high mol ratio of vinyl acetate to vinyl benzylidene diactate, such as 10:1 or 20:1, gives polymers which, upon saponification, are soluble in aqueous alcohol. After such polymers have been saponified and then subjected to cross-linking under such conditions as to consume all of the aldehyde groups, there will still remain a large percentage of the original hydroxyls which confer on the polymer relatively high water sensitivity (a large capacity for swelling in water) even though the polymer is not water soluble. In such cases, it may be desirable to acetalize all or part of the remaining hydroxyls with an aldehyde such as formaldehyde, acetaldehyde, butyraldehyde, etc. Sometimes it may be advantageous to have both cross-linking groups present in the ultimate polymer to but a minor extent, in which case a three or four component polymer may be produced.

Broadly, this invention contemplates synthetic linear addition polymeric compounds formed by polymerizing monomers of the type:

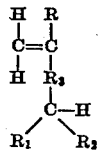

in which R is a monovalent atom or radical (e. g. hydrogen, halogen, aryl, aralkyl or substituted or unsubstituted, saturated or unsaturated, open chain or cyclic alkyl and is preferably hydrogen, halogen or a saturated aliphatic hydrocarbon radical), $R_1$ and $R_2$ are acyloxy (including aroyloxy), alkoxy, alkylthio, aralkoxy, aralkylthio or halogen and both $R_1$ and $R_2$ are free of unsaturated acyclic carbon-to-carbon bonds and $R_3$ is a carbocyclic structure containing benzylene, naphthylene, phenylene, diphenylene, cyclohexylene and other divalent cyclic groups. It is preferred that $R_3$ comprise a carbocyclic structure in which a ring carbon atom is directly attached to the carbon atom of the vinyl group and is also directly attached (preferably in para relation) to the CH of the hydrolyzable group, but there may be an intermediate connection, e. g. one or more additional carbons or oxygen between the carbocyclic structure and the carbon atom of the vinyl group, or any other non-hydrolyzable linkage may be present at that point; when connected through oxygen, the other two valences of the carbon atoms adjacent the oxygen must be satisfied only with monovalent members such as hydrogen or hydrocarbon, for if satisfied by oxygen or the like, the side chain will be split off by hydrolysis; when adjacent connectors are carbon, a carbonyl group is not objectionable. Examples of monmeric compounds capable of forming this type of polymer are vinyl benzylidene diacetate, alpha-methylvinyl benzylidene diacetate, alpha-phenylvinyl benzylidene diacetate, vinyl benzylidene acetate-chloride, vinyl benzylidene acetate-exthoxide, alpha-chlorovinyl benzylidene diacetate, vinyl benzylidene dipropionate, vinyl naphthylidene diacetate, vinyl diphenylidene diacetate and vinyl cyclohexylidene diacetate.

While the above-mentioned monomeric compounds may be polymerized alone, it is generally preferred to interpolymerize one of these compounds with one or more ethylenic compound having the general formula:

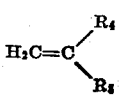

where $R_4$ is hydrogen, halogen or methyl and $R_5$ is hydrogen, halogen, methyl, methoxy, cyano, alkenyl, substituted alkenyl, alkinyl, acyloxy, acylthio, carbalkoxy, acyloxyalkyl, aryl, aralkyl, carbazyl, or pyridyl. Satisfactory interpolymerizing compounds include vinyl acetate, vinyl thioacetate, vinyl chloride, vinyl cyanide, vinyl fluoride, styrene, butadiene, chloroprene, isobutylene, methyl acrylate, methyl methacrylate, vinylidene chloride, ethylene, vinyl acetylene, vinyl carbazol, vinyl pyridine, etc.

Where monomeric compounds are used as the starting materials, polymerization may be carried out in any suitable manner commonly practiced for the production of vinyl polymeric compounds. As previously stated, the vinyl benzylidene ester or the like may be polymerized alone, in which case the polymer will contain only masked aldehyde groups, or it may be interpolymerized with other unsaturated compounds which may or may not contain masked hydroxyls. If desired, two, three or more interpolymerizing compounds may be combined with the masked aldehyde compound. The mol ratio of the masked aldehyde compound to the other interpolymerizing ingredient may vary widely, for instance from 1:2 to 1:20, more or less, depending upon the specific characteristics desired. Also, the degree of polymerization may range widely, the polymeric compounds having molecular weights of from 1,000 to 100,000 or more.

The aldehyde groups may be formed from the masked aldehyde group containing the polymer of the type previously set forth by hydrolysis in acid medium, by acid catalyzed alcoholysis, by saponification in an alkaline medium or by an alkaline catalyzed alcoholysis. (For convenience, the term "hydrolysis" can be used to designate the "unmasking" reaction where a general term is desired for the purpose of referring to this reaction although the term "hydrolysis" is frequently given its more restricted meaning throughout this specification.) Hydrolysis or alcoholysis in acid medium is preferably confined to those polymers containing no masked hydroxyls. Otherwise, the unmasked aldehyde and hydroxyls will immediately react in the acid medium to cross-link and insolubilize the structure. However, the acid method is not only entirely satisfactory, but the acid catalyzed alcohoylsis method is preferred where there are no masked hydroxyl groups in the initial polymer.

Whenever the aldehyde group is masked in an interpolymer by an acetal, hydrolysis or alcoholysis is somewhat more difficult and it must be carried out in an acid medium. It is desirable therefore if interpolymers are involved to have no masked hydroxyls present to interfere with the reaction in acid medium. Half acetals such as polyvinylbenzylidene acetate-ethoxide may be hydrolyzed or saponified either in alkaline or acid medium. When the alkaline saponification or alcoholysis is used, the masked aldehyde may not be unmasked immediately, for while the ester group is readily replaced by hydroxyl, the ether group may remain intact for a time although eventually the aldehyde will be unmasked.

The following examples which are intended to illustrate rather than to limit the invention and in which parts, proportions and percentages are by weight unless otherwise specified, describe various modes of applying the principles of the invention.

*Example I*

(This example describes an emulsion process for making an interpolymer of vinyl acetate and vinyl benzylidene diacetate in the mol ratio of 10:1.)

To a solution of 1 gram of sodium bicarbonate, 1 gram of sodium dihydrogen phosphate, 2.9 grams of sodium lauryl sulfate and 300 grams of water in a well stirred vessel, a mixture of 86 grams of vinyl acetate and 23.4 grams of vinyl benzylidene diacetate is added. A stream of carbon dioxide is run through the apparatus to dispel the air and the mixture is warmed to 25° C. and then 0.5 gram of ammonium persulfate catalyst is added. At this point, the mixture has a pH of 5.0. Then 0.3 gram of ascorbic acid is added and vigorous polymerization begins very shortly, as is evidenced by a rapid rise in temperature. The resulting product is a smooth, milky emulsion of low viscosity. After heating at 50° to 60° C. for an hour, the product is isolated by the addition of sufficient sodium chloride solution to coagulate the resin.

The product prepared above is soluble in methanol and 10% solution of the polymer is made up in methanol, heated to 55° C., and then made alkaline with methanolic sodium hydroxide solution until the pH is raised to 10.0 to 11.0. Alcoholysis begins and proceeds rapidly to completion, with the polymer precipitating from the solution in the form of a fine, flocculent flake. This polymer on isolation, is soluble in aqueous solutions and in particular in an aqueous solution containing a lower alcohol, such as ethanol or methanol. This product in aqueous methanol is rendered insoluble on treating with sufficient acid to lower the pH of the solution to 2.0 to 3.0. This is evidence of internal acetal formation and the development of cross-links.

*Example II*

(This example describes the preparation by a bulk method of an interpolymer of styrene and vinyl benzylidene diacetate in the mol ratio of 10:2.)

To a mixture of 104 grams of styrene and 46.8 grams of vinyl benzylidene diacetate, 0.5 gram of benzoyl peroxide is added and the mixture heated under reflux to bring about polymerization. After a short induction period, polymerization proceeds normally as is evidenced by a fairly rapid increase in viscosity. The mixture is heated to reflux for a total of ten hours, at which time the product is transparent, hard and solid. This product is soluble in toluene and other aromatic hydrocarbons and in a mixture of toluene and methoxyethanol. A solution of the polymer in a toluene-methoxyethanol mixture is subjected to acid alcoholysis by the addition of sufficient sulfuric acid to lower the pH of the solution to 1.0. Due to the relatively small amount of hydrolyzable material in this polymer, the product remains in solution during hydrolysis, but the presence of aldehyde groups can be detected by the application of the customary aldehyde tests such as the formation of hydrazones with various phenyl hydrazines. This product is not soluble in water but is still soluble in typical solvents for polystyrene.

*Example III*

(This example describes the preparation by a granular process of an interpolymer of methyl methacrylate, vinyl acetate and vinyl benzylidene diacetate in the respective mol ratio of 20:2:1.)

A mixture of 100 grams of methyl methacrylate, 8.6 grams of vinyl acetate, 11.7 grams of vinyl benzylidene acetate, 200 grams of water, 0.2 gram of sodium bicarbonate and 0.2 gram of polyvinyl alcohol (incomplete hydrolysis) is heated to reflux for five minutes to draw all the air out of the system and 0.5 gram of benzoyl peroxide catalyst is added. This mixture is heated to reflux with good stirring and polymerization proceeds normally. At the end of five hours, the solution refluxes above 95° C., indicating substantial completion of polymerization.

The mixture is cooled to room temperature and the product isolated by filtration and washing. The yield of this granular product indicates joint polymerization of all three monomers. In this polymer, the vinyl acetate and vinyl benzylidene diacetate are present in the correct proportions for complete acetal formation after saponification.

This product is not soluble in lower aliphatic alcohols but is soluble in the usual solvents for methyl methacrylate such as acetone, esters, aromatic hydrocarbons and methoxy ethanol. A solution of the polymer in a mixture of methoxy ethanol and methanol is heated to 60° C. and then made alkaline to a pH of 10.0 to 11.0 by careful addition of methanolic sodium hydroxide. The mixture is heated to 60° C. for several hours to insure completion of the alcoholysis, to produce free alcohol groups and free aldehyde groups. Due to the high content of methyl methacrylate, this product remains soluble in the alcohol mixture, but alcoholysis took place, as is evidenced by the fact that acidification of this solution, followed by the casting of film and baking at elevated temperature, results in an insoluble product, due to the probable formation of acetal cross-links. An insoluble product would not result in the unsaponified product under these conditions.

The polymerization catalysts used include those which catalyze the polymerization of vinyl compounds, e. g. vinyl acetate; organic peroxides such as benzoyl peroxide and diethyl peroxide as well as other per-compounds such as ammonium persulfate (which may be activated by bisulfites such as sodium bisulfite and metasodium bisulfite) are effective catalysts for the polymerization.

The masked aldehyde polymers of this invention, in view of their relatively low softening points and their solubility in many solvents are readily formed either by the wet or coagulation method involving the use of a coagulating liquid which is miscible with the polymer solvent, but which is not a solvent for the polymer, by the dry or evaporative method, or by the melt method of spinning or casting into all sorts of shaped articles such as sheets, films, wrapping tissue, tubing, filaments, bristles, yarns, threads and the like. Also, they may be used in various compositions such as for coating, finishing, casting or molding, for adhesion, lamination and the like. They may be admixed with natural or other synthetic polymeric materials, added to spinning or casting dopes of filament- or film-formers and spun or cast into filaments or film. Specifically, the interpolymers comprised of vinyl acetate are especially useful in cellulose acetate or other cellulose ester or cellulose ether compositions and when formed structures thereof are converted by saponification into partially or wholly regenerated cellulose, the aldehyde-containing polymer will simultaneously be formed, the aldehyde groups of which, if alkaline saponification is used, may subsequently be consumed to effect crosslinking within the structure to render the same stronger, tougher and more resistant chemically. In fact, any structure such as is mentioned above as comprised of or containing the masked aldehyde polymer of this invention may be converted into an insoluble and difficultly fusible form by unmasking the aldehyde of the polymer under such acid conditions as will cause it to react and produce cross-links.

Vinyl benzylidene diacetate may be prepared by reacting vinyl benzaldehyde with an excess of acetic anhydride in the presence of a mineral acid catalyst. The vinyl benzaldehyde may be prepared, for example, from vinyl benzoic acid by a two step process comprising reacting vinyl benzoic acid with phosphorous trichloride or other halogenating agent to produce vinyl benzoyl chloride which by catalytic reduction with a platinum catalyst poisoned with sulfur by the Rosermund Method yields vinyl benzaldehyde. This is given by way of illustration and other analogs or homologs may be prepared by the same general method.

Any departure from the description given above which conforms to the principles of the invention is intended to be included within the scope of the claims.

I claim:

1. An interpolymer of vinyl benzylidene diacetate and vinyl acetate.

2. An interpolymer formed by polymerizing a compound of the formula:

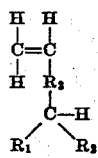

in which $R_1$ and $R_2$ are members of the group consisting of acyloxy and alkoxy, and both $R_1$ and $R_2$ are free of unsaturated acyclic carbon-to-carbon bonds and in which $R_3$ comprises a carbocyclic ring, with a polymerizable compound containing the ethylenic group $H_2C=C<$, said interpolymer containing in the chain the group:

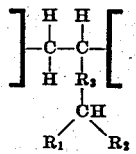

3. The product of claim 2 in which at least one of the radicals $R_1$ and $R_2$ is acyloxy.

4. The product of claim 2 in which $R_1$ and $R_2$ are both acyloxy.

5. An interpolymer formed by polymerizing a compound of the formula:

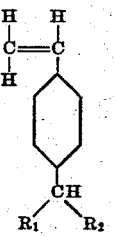

in which $R_1$ and $R_2$ are acyloxy groups free of unsaturated acyclic carbon-to-carbon bonds, with a polymerizable compound containing the ethylenic group $H_2C=C<$, said interpolymer containing in the chain the group:

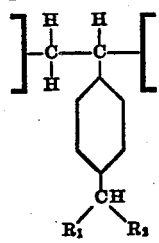

CARL SHIPP MARVEL.

REFERENCES CITED

The following references are of record in the file of this patent:

UNITED STATES PATENTS

| Number | Name | Date |
| --- | --- | --- |
| 2,349,136 | Britton et al. | May 16, 1944 |
| 2,417,404 | Minsk et al. | Mar. 11, 1947 |

FOREIGN PATENTS

| Number | Country | Date |
| --- | --- | --- |
| 679,944 | Germany | Aug. 16, 1939 |

OTHER REFERENCES

Krczil, Kurze Handbuch der Polymerisationtechnike, vol. 1, Leipzig, 1940, pages 513-14.